UNITED STATES PATENT OFFICE.

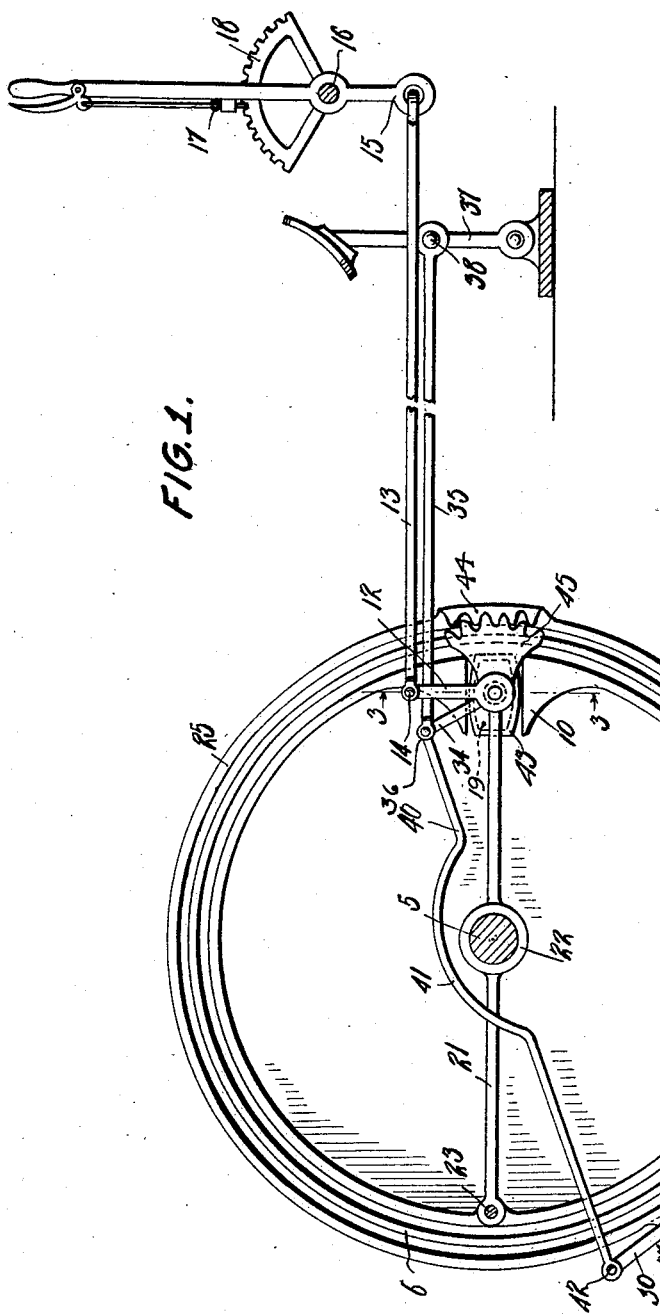

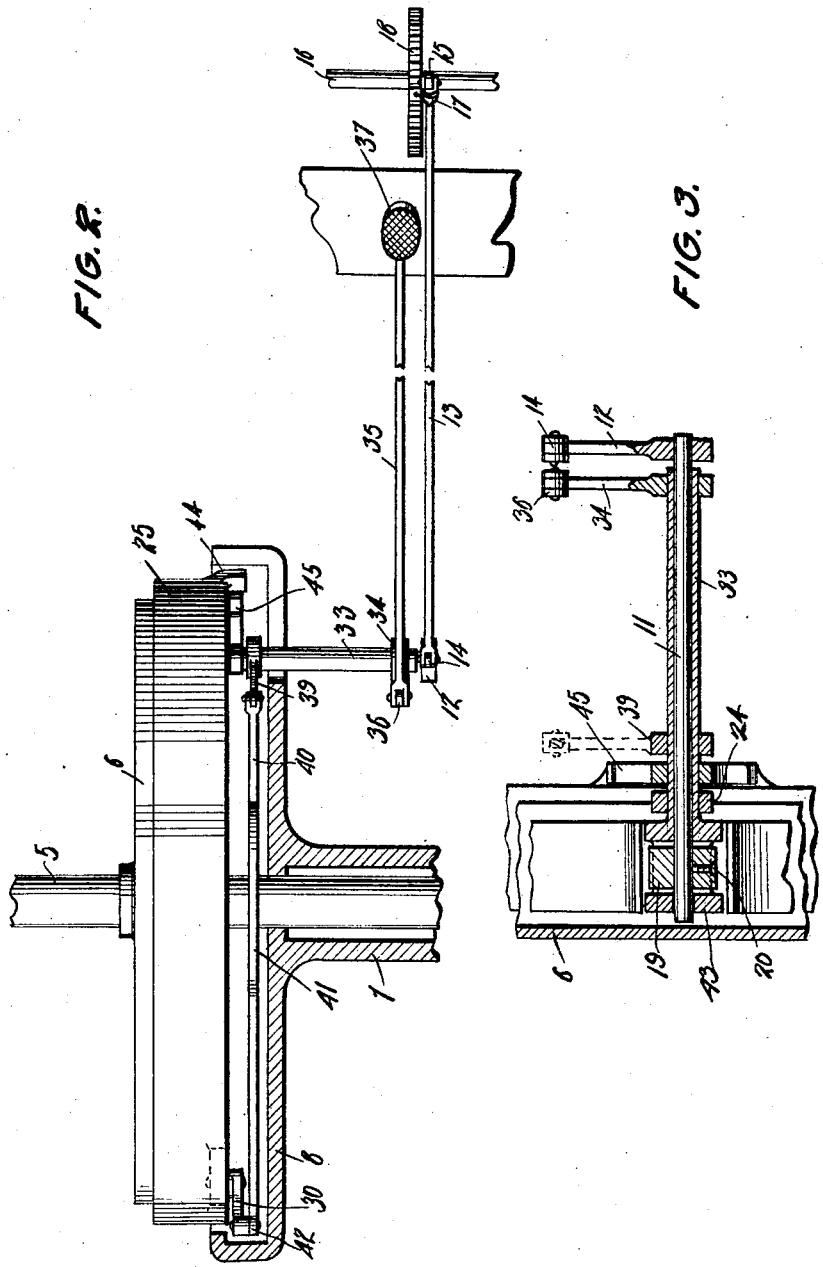

JOHN W. WHITE, OF SAN ANTONIO, TEXAS.

BRAKE.

1,417,435.   Specification of Letters Patent.   Patented May 23, 1922.

Application filed September 27, 1918. Serial No. 255,919.

*To all whom it may concern:*

Be it known that I, JOHN W. WHITE, a citizen of the United States, residing at San Antonio, in the county of Bexar and State of Texas, have invented certain new and useful Improvements in a Brake, of which the following is a specification.

This invention is a brake and has for its principal object the production of a device which will utilize the momentum of the vehicle for firmly applying the brake after an initial movement on the part of the operator.

Another object of this invention is the production of a brake wherein inner and outer brake bands are employed upon the brake drum, together with associated means for firmly binding these brake bands upon the drum for setting the brake by the momentum of the vehicle, after an initial start of the operation of the brake.

Another object of this invention is the production of a brake wherein an ordinary braking device is employed for setting the brake by separate energy independent of the braking mechanism employed for firmly setting the brake by the momentum of the vehicle.

Another object of this invention is the production of a brake wherein inner and outer brake bands are employed upon a braking drum, together with means for applying the outer brake band to the drum, thus causing an associated mechanism to be operated for firmly bringing the inner brake band into engagement with the brake drum and also holding the outer brake band in a binding engagement, thus causing the momentum of the vehicle to apply the brake after an initial start of operation.

One practical form of construction and assembly of the present invention will be hereinafter described and is illustrated in the accompanying drawing, in which Figure 1 is a side elevation of the brake.

Figure 2 is a top plan view of the device, showing the drum housing in section.

Figure 3 is a vertical section taken on the line 3—3 of Figure 1, and

Figure 4 is a fragmentary detail perspective of a portion of the outer brake band.

In the preferred embodiment of the present invention, about to be described, 5 indicates the axle having the brake drum 6 fixed thereon in any desired manner. The sleeve 7 surrounds the axle 5 and is provided with a housing 8 fitting adjacent one side portion of the drum, as illustrated in Fig. 2. It is of course obvious that any form of brake drum may be employed in connection with the present invention.

The inner brake band 9 is substantially circular, as indicated in Figure 1 and fits within the brake drum 6 in the usual manner. This inner brake band 9 is provided with spaced apart ends having thickened webs 10 formed thereon in spaced relation and these webs 10 have comparatively broad bearing surfaces spaced apart for purposes to be hereinafter set forth.

A shaft 11 has a lever 12 fixed upon its end, as indicated in Figure 3, while the rod 13 is connected to the outer end of the lever 12, and is pivotally connected thereto as indicated at 14. The opposite end of the rod 13 is connected to the lower end of the actuating lever 15 carried upon the supporting shaft 16 this lever constituting the hand lever of the usual brake mechanism used under ordinary conditions to apply the brake to stop the vehicle or to hold the brake mechanism applied when the vehicle is at a standstill. This actuating lever 15 is provided with a detent 17 releasably engaging the quadrant 18. This lever 15 as herein illustrated, is operated by hand and for this reason may be swung in either of two directions for shifting the rod 13. As this rod 13 is moved, it will swing the lever 12 and thus cause the shaft 11 to be rotated. The shaft 11 extends into the brake drum 6 and has a solid cam 19 fixed thereon as indicated at 20 and this cam 19 is interposed between the webs 10 of the inner brake band 9. This cam 19 is elongated, as indicated in dotted lines in Figure 1, and it is therefore obvious that as the shaft 11 is rotated, the cam 19 will be turned to force the webs 10 apart, and thus bring the inner brake band 9 into binding engagement with the brake drum 6 for applying the brake.

A supporting bar 21 is provided with a central sleeve 22 carried by the axle 5 and it will be noted that one end of the bar 22 is secured as indicated at 23 to the inner brake band 9, while a sleeve 24 is carried by the opposite end of the bar 21 and is supported in a manner to be hereinafter set forth. It will thus be seen that the brake band 9 will be efficiently supported to be brought into a binding engagement with the brake drum for applying the brake by hand. It is obvious that as soon as the actuating handle 15 is swung to its normal neutral position, as indicated in Figure 1, the cam 19 will be returned to its neutral position, and the resiliency of the brake band 9 will cause the same to disengage the brake drum 6 and free the same from its braked condition.

The manner in which the brake may be set by hand has hereinbefore been explained, and now attention is invited to the following description which discloses the manner in which the momentum of the vehicle is employed for firmly applying the brake after the initial start of operation by the operator.

The outer brake band 25 surrounds the brake drum 6 as indicated clearly in Figures 1, 2 and 3. This outer brake band is of a resilient and flexible nature and is also substantially circular to normally fit very close to the brake drum 6. This outer brake band 25 has spaced apart ends provided with lugs 26 and 27. A link 28 is pivotally mounted as indicated at 29 upon the lug 26, while the bell-crank lever 30 is pivotally mounted as indicated at 31 upon the lug 27 and is connected to the link 28, as shown at 32. Accordingly, when the bell-crank lever is pulled in one direction, it will pull upon the link 28 and will force its lug 27 in one direction, thus causing the lugs 26 and 27 to be urged toward each other and thus bring the brake band 25 into a binding engagement with the brake drum 6.

A sleeve 33 is rotatably mounted upon the shaft 11 as shown in Figure 3 and has the lever 34 fixed thereon adjacent its outer end. A connecting rod 35 is pivotally mounted as indicated at 36 upon the lever 34 and is also connected to the foot lever 37 as indicated at 38. Therefore, as the foot lever 37 is urged in one direction, it will draw upon the rod 35, thus causing the lever 34 to rotate the sleeve 33. A second lever 39 is fixed upon the sleeve 33 and has a connecting bar 40 connected thereto. This bar 40 is provided with an off-set bowed portion 41 to allow the same to clear the axle 5 without interference and the rear end of this connecting bar 40 is pivotally connected as indicated at 42 upon the bell-crank lever 30. Accordingly, when the sleeve is turned, the lever 39 will be shifted to draw upon the connecting bar 40, and as this bar is shifted it will draw upon the bell-crank lever 30 and thus cause the ends of the outer brake band to be urged toward each other to apply the outer brake band to the brake drum.

A hollow cam member 43 is formed upon the inner end of the sleeve 33, and it will be noted by referring to Figure 3 that the solid cam 19 of the shaft 11 is carried within this hollow cam 43. This hollow cam is interposed between the webs 10 of the inner brake band 9 for purposes to be hereinafter set forth. It will further be noted that the sleeve 33 extends through and is supported by the portion 24 of the bar 21.

A rack 44 is formed upon one side edge of the outer brake band 25, as illustrated clearly in Figure 4. A sector shaped rack member 45 is fixed upon the sleeve 33 and meshes with the rack member 44 formed on the outer brake band 25. It should be noted that the sector shaped rack member carried by the sleeve and the rack member carried by the outer brake band are in meshing engagement with each other at all times.

When the vehicle is moving at a rapid speed and it is desired to bring the same to a standstill very quickly, the operator pushes the foot lever 37 and thus draws upon the rod 35 to swing the lever 34 and thus rotate the sleeve 33. When the sleeve is rotated, it causes the lever 39 to draw upon the bar 40 and swing the bell-crank lever 30, which in swinging will pull upon the link 28 and cause the ends of the outer clamping band to be brought toward each other and thus bring the outer clamping band into binding engagement with the brake drum 6.

This outer brake drum is to be supported in any desired manner so as to be allowed to move for a slight distance in either forward or backward direction with the movement of the brake drum. As the brake band 25 moves as just specified, it is obvious that the position of the rack member 44 formed upon one side edge thereof will be changed, and as it is changing it will draw upon the sector shaped rack member 45 carried by the sleeve 33. As this rack member 45 is turned, it will continue turning of the sleeve 33 originally started by the shifting of the foot lever 37. The initial turning of the sleeve 33 will of course tend to rotate the hollow cam 43 to force the webs 10 away from each other and bring the inner brake band into a binding engagement with the drum 6. It is therefore obvious that if the vehicle is moving very fast, the greater the momentum thereof the more firmly the inner brake band will be applied to the brake drum.

The momentum of the vehicle will cause greater rotary power to be applied to the axle 5 and correspondingly through the drum 6 to the brake band 25. The outer brake band 25 after moving a slight distance will exert its power upon the brake drum, and furthermore, the shifting movement of the outer brake band will cause the sector shaped rack member 45 to hold the hollow cam member 43 in a very firm turned position holding the web members 10 spaced a considerable distance apart. In this way the inner brake band 9 will be firmly held in engagement with the brake drum.

From this construction, it is obvious that the greater the momentum of the vehicle, the more firmly the inner brake band will be applied to the drum for braking the vehicle. When it is desired to allow the vehicle to again move, the foot pedal is released and returned to its normal position, thus causing the sleeve 33 to be returned to its normal position. As this sleeve returns to its normal position, it will release the outer brake band 25, which will allow the cam 43 to assume the position indicated in Figure 1, whereby the inner brake band will release the brake drum 6. Thus both brake bands will very quickly release the drum and allow the same again to rotate with the axle 5. It is of course obvious that the hand lever and foot brake need not be employed as herein specified, for any other suitable mechanism may be employed for setting the brake. Although the hand lever is employed to allow the brake band to be set by energy for braking the vehicle, it is obvious the foot lever may be first shifted so that the movement of the outer brake band with the brake drum for a short distance will cause both the outer and inner brake band to be firmly applied for braking the vehicle.

The device herein described relates to a brake which may be used on all forms of vehicles which include among others, automobiles and motor driven trucks, as well as railway cars, locomotives, coaches and like devices, without in any way departing from the spirit of the present invention.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a device of the class described, the combination of a brake drum, inner and outer brake bands carried adjacent said drum and having spaced apart ends, means for applying the outer brake band to said drum, a cam interposed between the ends of the inner brake band, a rack member carried by said outer brake band, a sector shaped rack member connected to said cam and engaging the first mentioned rack member, whereby when the outer brake band is applied to said drum and moves for a distance therewith, said rack members will move to shift the cam to expand the inner brake band, thus causing the inner brake band to be brought into a binding engagement with said drum.

2. In a device of the class described, the combination of a brake drum, inner and outer brake bands carried adjacent said drum, said inner brake band having spaced apart ends, a solid cam carried between said ends, a hollow cam carried between said ends, and receiving said solid cam, means for manually applying said solid cam for bringing the inner band into a binding engagement with said drum, and means connected to said hollow cam and to said outer brake band, whereby when the outer brake band is applied to said drum, it will move for automatically shifting said hollow cam for moving said inner brake band into a binding engagement with said drum.

3. In a device of the class described, the combination of a drum, an outer brake band having spaced apart ends, an inner brake band having spaced apart ends, said bands being carried adjacent said drum, a shaft extending into said drum, a sleeve carried upon said shaft and extending into said drum, means for independently shifting said shaft and said sleeve, a solid cam carried by said shaft between the ends of said inner band, a hollow cam formed on said sleeve and receiving said solid cam and fitting between the ends of said inner band, said shaft being adapted to be turned for moving said solid cam and bringing said inner band into binding engagement with said drum, a rack member fixed upon said sleeve, a rack member fixed upon said outer brake band, said rack members engaging each other, means for forcing the ends of said outer band toward each other thereby bringing the outer band into binding engagement with said drum, whereby the outer band will move with said drum for a distance, causing said rack members to shift and turn said sleeve and said hollow cam member which in turn will force the ends of the inner band apart and bring the latter into binding engagement with said drum.

4. In a device of the class described, the combination of a brake drum, inner and outer brake bands carried adjacent said drum, means for collapsing the outer band to cause the outer band to engage said drum, a rack member carried by said outer band, a rack member engaging said first mentioned rack member and connected to means engaging the inner band, whereby when the outer band is applied said rack members will cooperate by the momentum of the drum to actuate the said last mentioned means to apply the inner brake band.

5. In a device of the class described, the combination of a drum, inner and outer brake bands carried adjacent said drum and having their ends spaced apart, a link and bell-crank lever connected to the ends of the outer band, a cam interposed between the ends of the inner band, a sleeve connected to said cam, a lever extending from said sleeve, a bar connected to said bell-crank lever and to said last mentioned lever, said bar having an off-set portion intermediate of its ends, and means for turning said sleeve whereby said outer band will be collapsed and said inner band will be expanded into binding engagement with said drum.

6. In a device of the class described, the combination of a drum, inner and outer bands carried adjacent said drum and having their ends spaced apart, a shaft having a sleeve turnably mounted thereon, means for independently turning said shaft and said sleeve, a solid cam fixed on the inner end of said shaft, a hollow cam member carried by the inner end of said sleeve and fitting about said solid cam, said solid cam and said hollow cam member fitting between the ends of said inner band, means for connecting said sleeve to said outer band, whereby when said outer band is collapsed in engagement with said drum the last mentioned means will turn said sleeve to cause said hollow cam member to force the ends of the inner band apart and expand the latter into binding engagement with said drum, while permitting said shaft to be turned to cause said solid cam to expand said inner band.

7. In a device of the class described, the combination of a drum, inner and outer bands carried adjacent said drum, said outer band having a rack member thereon, a rack member engaging the first mentioned rack member, means connecting said second mentioned rack member to the inner band, means for bringing the outer band into binding engagement with said drum, whereupon the rack members will move to cause said last mentioned means to bring the inner band into binding engagement with said drum.

In testimony whereof I affix my signature in the presence of two witnesses.

JOHN W. WHITE.

Witnesses:
 RAY TOOMEY,
 RUTH POLEAU.